United States Patent
Roth et al.

(10) Patent No.: US 7,337,551 B2
(45) Date of Patent: Mar. 4, 2008

(54) PROBE HEAD FOR A COORDINATE MEASURING MACHINE

(75) Inventors: Roland Roth, Waldstetten (DE); Walter Dominicus, Koenigsbronn (DE); Wolfgang Strauss, Staig (DE); Karl Seitz, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 112 days.

(21) Appl. No.: 11/191,660

(22) Filed: Jul. 28, 2005

(65) Prior Publication Data

US 2006/0010702 A1 Jan. 19, 2006

Related U.S. Application Data

(63) Continuation of application No. PCT/EP03/14584, filed on Dec. 19, 2003.

(30) Foreign Application Priority Data

| Jan. 31, 2003 | (DE) | ................................ 103 04 827 |
| Mar. 25, 2003 | (DE) | ................................ 103 14 304 |

(51) Int. Cl.
 *G01B 5/00* (2006.01)
(52) U.S. Cl. .......................................... 33/559; 33/556
(58) Field of Classification Search ................. 33/556, 33/559, 503–504
See application file for complete search history.

(56) References Cited

U.S. PATENT DOCUMENTS

| 3,171,036 | A | 2/1965 | Stark |
| 4,510,693 | A | 4/1985 | Cusack |
| 5,825,666 | A | 10/1998 | Freifeld |
| 6,546,643 | B2 * | 4/2003 | Lotze et al. ................... 33/559 |
| 6,789,327 | B2 | 9/2004 | Roth et al. |
| 6,886,265 | B2 * | 5/2005 | Fracheboud et al. .......... 33/559 |
| 7,111,410 | B2 * | 9/2006 | Haimer ........................ 33/559 |
| 7,124,514 | B2 * | 10/2006 | McMurtry et al. ............ 33/556 |
| 2002/0174556 | A1 | 11/2002 | Butter et al. |
| 2005/0259271 | A1 | 11/2005 | Christoph |

FOREIGN PATENT DOCUMENTS

| DE | 24 40 692 | 4/1975 |
| DE | 33 21 454 C2 | 12/1983 |
| DE | 34 22 103 C3 | 12/1984 |

(Continued)

OTHER PUBLICATIONS

Renishaw GmbH; Die Renishaw-Gruppe-Weltweit vertreten; 1996; 40 pages.

(Continued)

*Primary Examiner*—Yaritza Guadalupe-McCall
(74) *Attorney, Agent, or Firm*—Harness, Dickey & Pierce, P.L.C.

(57) ABSTRACT

A probe head for a coordinate measuring machine has a replaceable, miniaturized probe system with a stylus. The stylus is rigid and forms a structural unit together with a membrane-type sensor system that is deformed in a predetermined way when a force acts on the stylus. The structural unit is permanently fixed to a probe holder and can be handled together with the probe holder when the stylus is being replaced.

21 Claims, 5 Drawing Sheets

FOREIGN PATENT DOCUMENTS

| | | |
|---|---|---|
| DE | 35 30 229 C2 | 2/1986 |
| DE | 3804111 C2 | 8/1989 |
| DE | 101 08 774 A1 | 9/2002 |
| EP | 0 293 036 | 11/1988 |
| EP | 0 548 328 B1 | 6/1993 |
| WO | WO 02/25206 A1 | 3/2002 |

OTHER PUBLICATIONS

Renishaw GmbH; Probing Systems For Increased Productivity With Coordinate Measuring Machines; 56 pages.

* cited by examiner

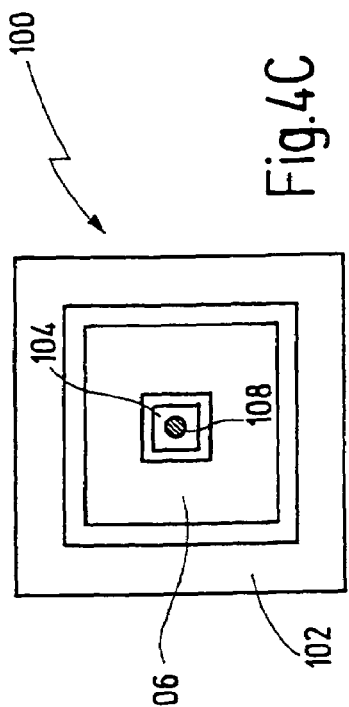
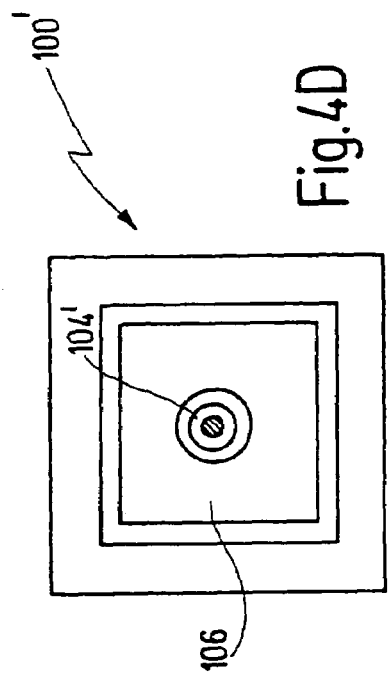
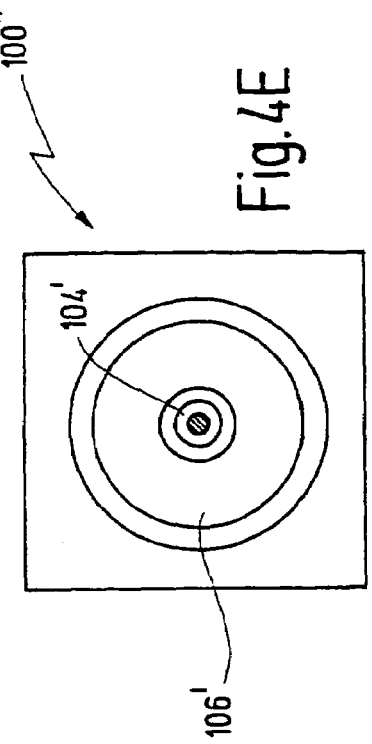
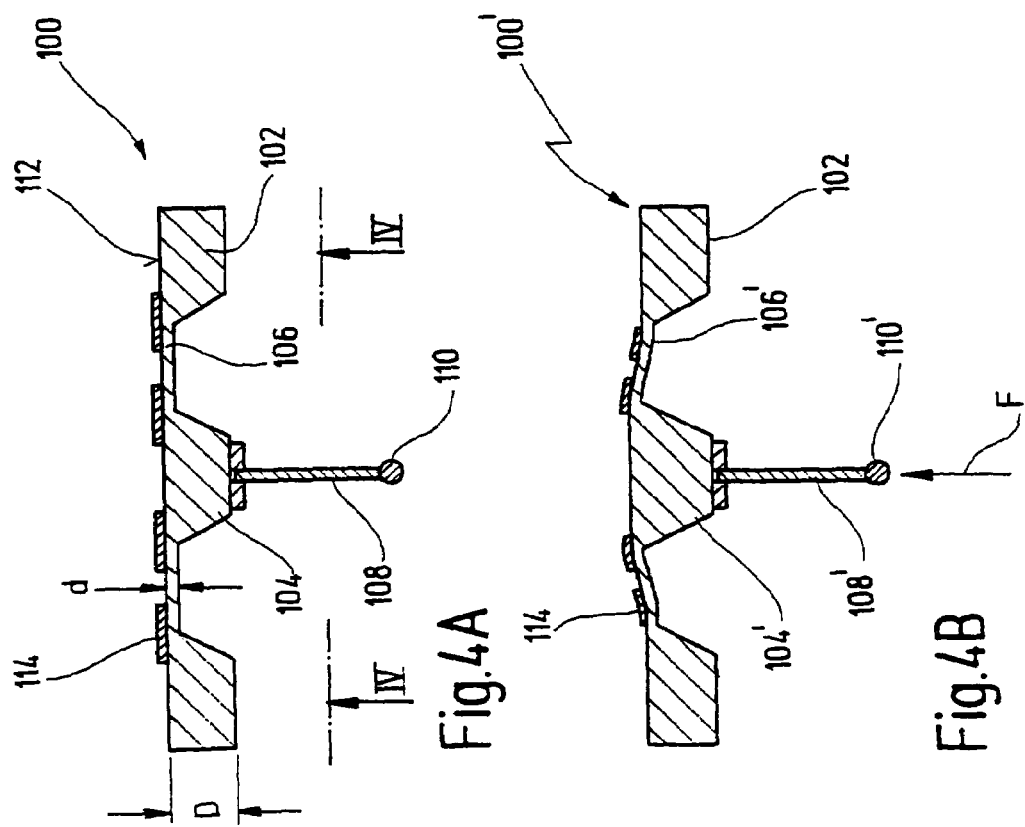

PROBE HEAD FOR A COORDINATE MEASURING MACHINE

CROSS-REFERENCES TO RELATED APPLICATIONS

The present application is a continuation of international patent application PCT/EP2003/014584, filed on Dec. 19, 2003 designating the U.S. and published as WO 2004/068068 A1 in German language, which claims priority under the Paris Convention from German patent applications DE 103 04 827.8 filed on Jan. 31, 2003 and DE 103 14 304.1 filed on Mar. 25, 2003.

BACKGROUND OF THE INVENTION

The invention relates to a probe head for a coordinate measuring machine and more particularly to a probe head having a replaceable, miniaturized probe system with a rigid stylus that forms a structural unit together with a membrane-type sensor system that deforms in a predetermined way when a force acts on the stylus.

In the case of conventional coordinate measuring machines, it is often necessary to replace the stylus so that measurement tasks of different types can be carried out consecutively. These measurement tasks include, for example, the measurement of bores of different depth, the measurement of bores of different inside diameter and the like. It is desirable to have styluses of different lengths and having stylus balls of different diameter at the end.

In an embodiment, DE 101 08 774 A1 discloses a new type of a miniaturized probe system for a probe head, wherein the stylus is mounted on a membrane-type arrangement which is square in plan view and which has a thickened periphery edge. Located in the middle of the arrangement is another thickened portion, which supports the stylus. Located between the edge and the middle is a membrane-type zone which is provided with piezoresistive elements or with strain gauges on a side facing away from the stylus. Deflecting the stylus leads, in this case, to the membrane-type zone being distorted or deformed and therefore to a signal being produced via the piezoresistive elements or the strain gauges. According to DE 101 08 774 A1, such a probe system cannot be replaced. Rather, the thickened periphery edge of the probe system is permanently fixed to the probe head.

SUMMARY OF THE INVENTION

It is an object of the invention to provide a probe head for use with a miniaturized probe system which allows a replacement of the stylus in a simple and reliable manner. It is another object to provide a probe head for use with a miniaturized probe system which allows a automated replacement of the stylus, in particular in connection with a CNC-controlled coordinate measuring machine.

According to one aspect of the invention, this object is achieved for a probe head of the type mentioned at the beginning, wherein the structural unit is permanently connected to a probe holder, the structural unit being able to be handled together with the probe holder when the stylus is being replaced.

According to another aspect of the invention, this object is achieved by a probe of the type mentioned at the beginning wherein separate means are provided for mechanically fastening the structural unit on the probe, on the one hand, and for electrically connecting the sensor elements of the probe system, on the other hand.

In accordance with the first aspect, a larger and easier to handle element is formed by providing the probe holder which is connected to the structural unit. A probe holder can be handled more easily without the risk of the stylus breaking off even in the event of slight inattentiveness.

In accordance with the second aspect the structural separation between mechanical fastening, on the one hand, and electrical connection, on the other hand, permits each of these two functions to be optimized in a separate fashion including in a temporal sequence. Thus it is possible, for example, firstly to fasten the structural unit mechanically and then to connect it electrically, or the electrical connection is accomplished automatically when the mechanical fastening is concluded.

In a preferred refinement of the probe head according to the invention, the probe holder is constructed like a sleeve.

This measure has the advantage that the probe holder can be gripped in a simple way and, for example, can be fixed in a simple way by being pushed onto or being pushed into a corresponding counterpart.

It is preferred, furthermore, when a rear section of the probe holder is configured to be connected to a probe receptacle of the coordinate measuring machine.

This measure has the advantage that the interface composed of the probe holder and the probe receptacle can be optimized individually for the respective application.

This holds, in particular, when in accordance with a refinement of this variant the rear section is configured to be connected to the probe receptacle via a conical fit.

This measure has the advantage that it is possible to achieve a perfect equiaxiality with regard to the probe holder and probe receptacle.

In a further preferred embodiment of the invention, the sensor system is mounted on a front section of the probe holder.

This measure has the advantage that the sensor system is optimally exposed.

Also preferred is an embodiment of the invention in which the probe holder is configured to be connected to the probe receptacle in a rotary position defined with reference to an axis of the probe receptacle.

This measure also has the advantage of achieving a high reproducibility of the measurement result. Furthermore, it is advantageous that a position of the probe holder and, thus, of the structural unit consisting of the membrane-type sensor system and the miniaturized stylus, defined in a direction of rotation as well, the sensor system is installed in a completely defined position such that the electric contact can be made with the sensor system in a reproducible way.

In accordance with a refinement of the this variant of the invention, there is provided a ball for the purpose of defining the rotary position, which ball falls into a groove of the probe receptacle or into a bore on the probe holder in the defined rotary position.

This measure has the advantage that it is possible to reliably achieve and maintain the defined rotary position when the ball has fallen into the bore together with a simple mounting.

In further preferred embodiments of the invention, the probe receptacle extends along an axis and the probe holder is configured to be connected to a front end section of the probe receptacle.

This measure has the advantage of enabling a strictly axial design such as can be used, in particular, in conjunction with quills of coordinate measuring machines of gantry design or of free arm design.

In the case of further preferred embodiments of the invention, the sensor system is mounted on a radial rear side of the probe holder.

This measure has the advantage that the sensor system is accommodated in a largely protected fashion. Furthermore, the sensor system thus has an axial abutment such that the sensor system can be approached from its rear side, for example for the purpose of making electric contact.

According to a further exemplary embodiment of the invention, the sensor system is adhered to the probe holder.

This measure has the advantage that the unit formed with the probe holder can be prefabricated in a simple way, a permanent connection being produced between the sensor system and probe holder by the bonding.

In accordance with a variant of the two above-mentioned exemplary embodiments, the sensor system can be adhered to the rear side of the probe holder, for which purpose it is preferred to provide bonding pockets for holding adhesive in the area of the rear side.

These measures have the advantage of enabling a simple mechanical prefabrication that leads to a stable structure.

In the case of the above-mentioned exemplary embodiments, it is further preferred when the stylus projects through a central opening in the rear side.

This measure has the advantage that a mechanical encapsulation of the sensor system can be implemented as far as possible, only those parts being exposed that must be exposed for mechanical reasons.

In a further group of exemplary embodiments, the sensor system is configured to be accessed from its rear side facing from the stylus for the purpose of detecting its deformation.

This measure has the advantage that all the measured data can be acquired in the encapsulated region of the probe, and that the actual measurement at the stylus is thereby not impeded.

When the sensor system has electric sensor elements for detecting the deformation, it is particularly preferred, when contact can be made with the sensor elements from the rear side.

In accordance with a preferred development of the invention, this is achieved by virtue of the fact that spring pins are provided for making contact with the sensor elements.

This measure has the important advantage that contact with the sensor elements can be made automatically when the probe holder with the sensor system mounted thereon is mounted on the probe head. The contact force can be set in a desired way by designing the spring pins appropriately. The resilient bearing of the spring pins furthermore has the advantage that it is possible to compensate for fitting errors present in the axial alignment of the spring pins.

In the case of this variant of the invention, it is further preferred when a plurality of spring pins are held in a spring pin holder.

This measure has the advantage that a multiplicity of electric contacts can be produced at the same time with a single common component, namely the spring pin holder.

For this purpose, the spring pin holder is preferably mounted in the front end section of the probe receptacle. This is preferably performed by pushing the probe holder onto the front end section and by plugging the spring pin holder into the front end section.

If, in a further refinement, the probe holder is configured to be screwed together with the end section, preferably by means of a union nut, it is possible by means of a few manipulations to mount the inventive probe with all the elements of interest in the present context.

In the case of this group of exemplary embodiments, it is further preferred when the spring pin holder is configured to be fastened in a predetermined rotary position relative to an axis of the probe holder.

This measure has the advantage already indicated further above according to which it is possible to make exact contact due to the complete definition of the position of the elements, even if it is necessary to make contact with a plurality of sensor elements.

Although sensor systems of the most varied type can be used within the scope of the present invention, it is nevertheless preferred to use a miniaturized sensor system that has a thickened edge, in which case the stylus is arranged in the middle of the sensor system, and a membrane area is located between the edge and the middle.

In the case of the above-mentioned type of sensor systems, the membrane area can be in the form of a polygonal, preferably rectangular, and even more preferred a square frame, in plan view.

However, it is particularly preferred when in plan view the membrane area is of annular construction.

This measure has the advantage that notch effects are avoided at the most highly stressed points of the membrane area. Consequently, larger deformations are possible—under the same force conditions—until the breaking point of the membrane area is reached. Furthermore, it is advantageous that symmetrical signal profiles arise in the plane of the membrane area, i.e. usually in the so called X-Y-plane of the coordinate measuring machine. Finally, a greater sensitivity of the sensor system is obtained when the sensor elements are positioned directly on the inner edge of the membrane area, where the maximum deformations occur.

It is furthermore preferred, when the middle is of thickened construction. The thickened middle can be constructed in this case as a pyramidal frustum.

However, it is particularly preferred when the thickened middle is constructed as a conical frustum.

This measure is a particularly effective supplement to the annular construction of the membrane area in order to achieve the advantages already cited above even more completely.

The exemplary embodiments with the annular membrane area and the middle thickened in the form of a conical frustum can also be used independently of the other features of the invention presently being described.

It is also preferred when the structural unit can be handled by means of a numerically controlled robot when the stylus is being replaced.

This measure has the advantage that it is possible to switch the stylus between two individual measurement tasks in an extremely short time and with the highest reproducibility and lowest risk of damaging the stylus.

Further advantages emerge from the description and the attached drawing.

It goes without saying that the features mentioned above and those yet to be explained below can be used not only in the respectively specified combination, but also in other combinations or on their own without departing from the scope of the present invention.

BRIEF DESCRIPTION OF THE DRAWINGS

An exemplary embodiment of the invention is illustrated in the drawing and will be explained in more detail in the following description. In the drawing:

FIGS. 4A and 4B show side views, in section and on an enlarged scale, of a sensor system of the probe head in accordance with FIGS. 1 and 2, in two different operating positions;

FIGS. 4C and 4E show plan views of three exemplary embodiments of the sensor system in accordance with FIG. 4A, in the direction of the arrows IV-IV of FIG. 4A.

DESCRIPTION OF PREFERRED EMBODIMENTS

Figure 1:
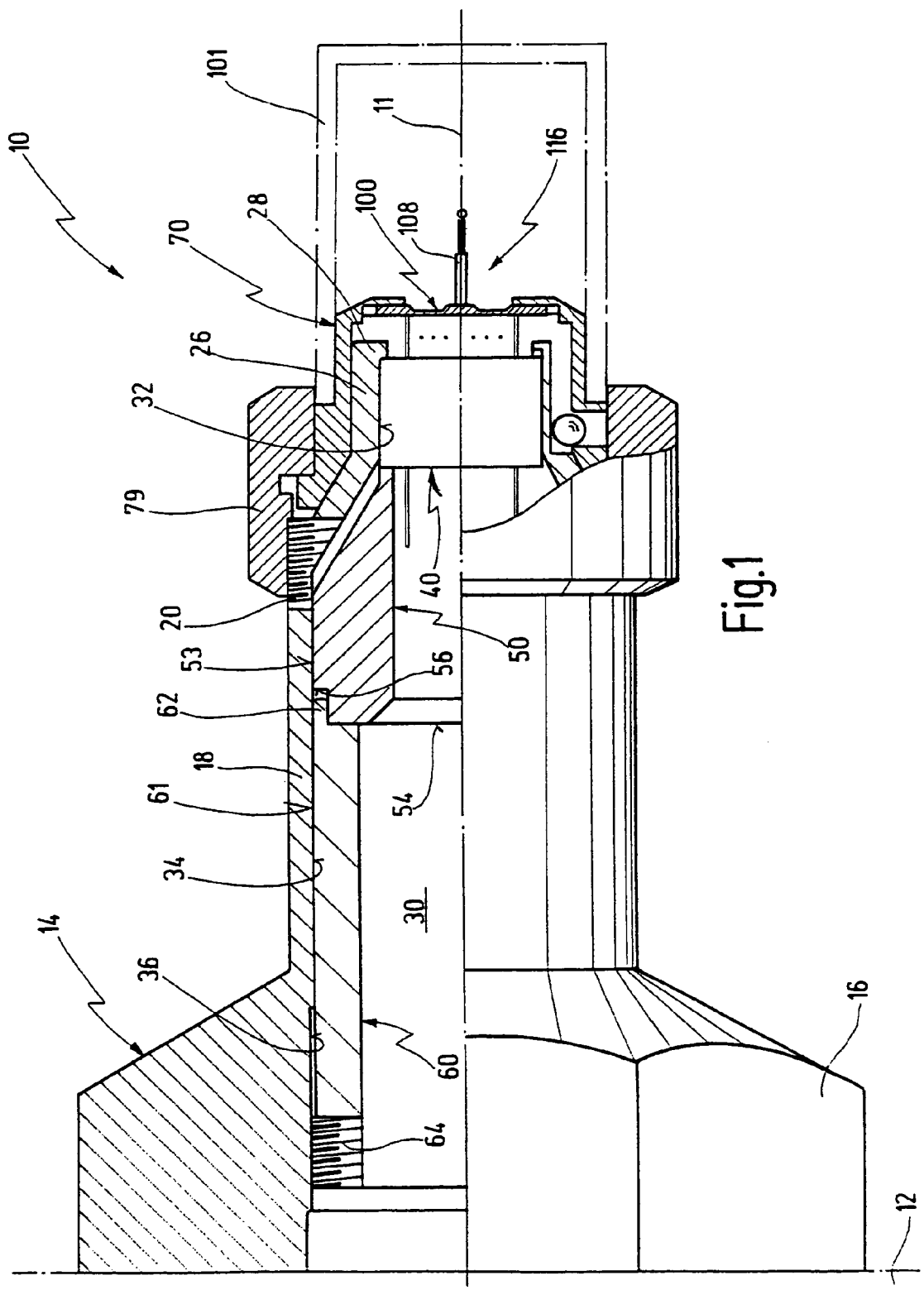
FIG. 1 shows a side view, partially cut away, through an exemplary embodiment of a probe head according to the invention.

FIG. 1 shows an exemplary embodiment of a probe head according to the invention with reference numeral 10. The probe head 10 can be arranged, for example, on the lower end of a quill of a coordinate measuring machine of gantry design or of free arm design. This is indicated in FIG. 1 with reference numeral 12. The probe head 10 extends substantially along an axis 11 that is illustrated horizontally in FIG. 1 and in practice is mostly a vertical axis, the so called Z-axis.

The probe head 10 has a probe receptacle 14 at its left-hand end in FIG. 1. The probe receptacle 14 has a polygonal head 16 at its left-hand end in FIG. 1. Following thereupon on the right is a middle section 18 which terminates in an external thread 20. This is followed by a conically tapering section 22 whose conical outer surface is denoted by 24. Finally, there is provided at the right-hand end of the probe receptacle 14 in FIG. 10 a front end section 26 that tapers radially in the form of an inner annular shoulder 28.

The probe receptacle 14 is provided inside along the axis 11 with a stepped through opening 30. The through opening 30 is formed at the right-hand end of the probe receptacle 14 in FIG. 1 by a first inner cylindrical surface 32. Located in the middle section 18 is a second inner cylindrical surface 34 which has a somewhat larger diameter and terminates on the left in FIG. 1 in an internal thread 36.

Figure 2:
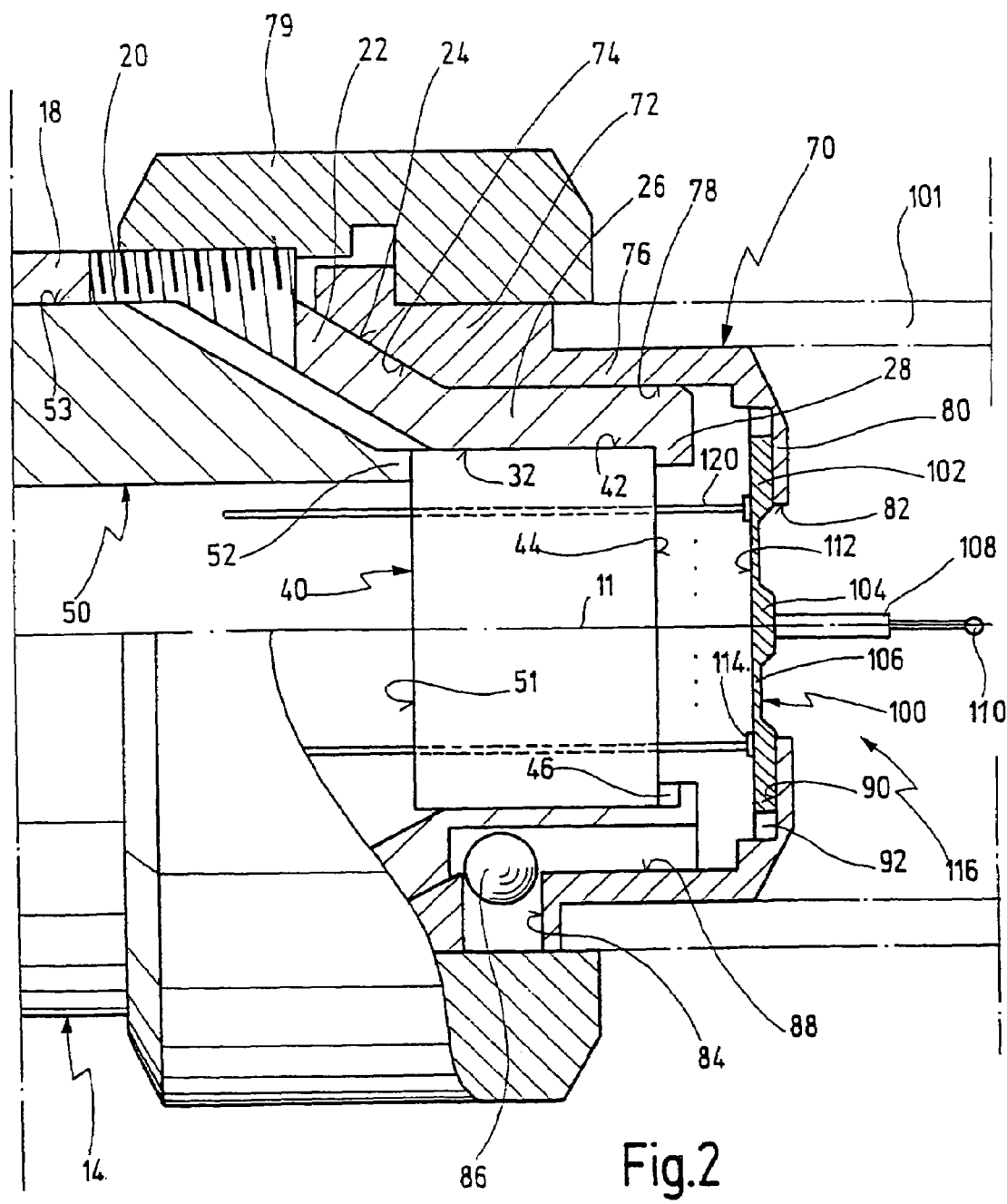
FIG. 2 shows a detail from FIG. 1, on an enlarged scale, for the purpose of explaining further details.
Figure 5:
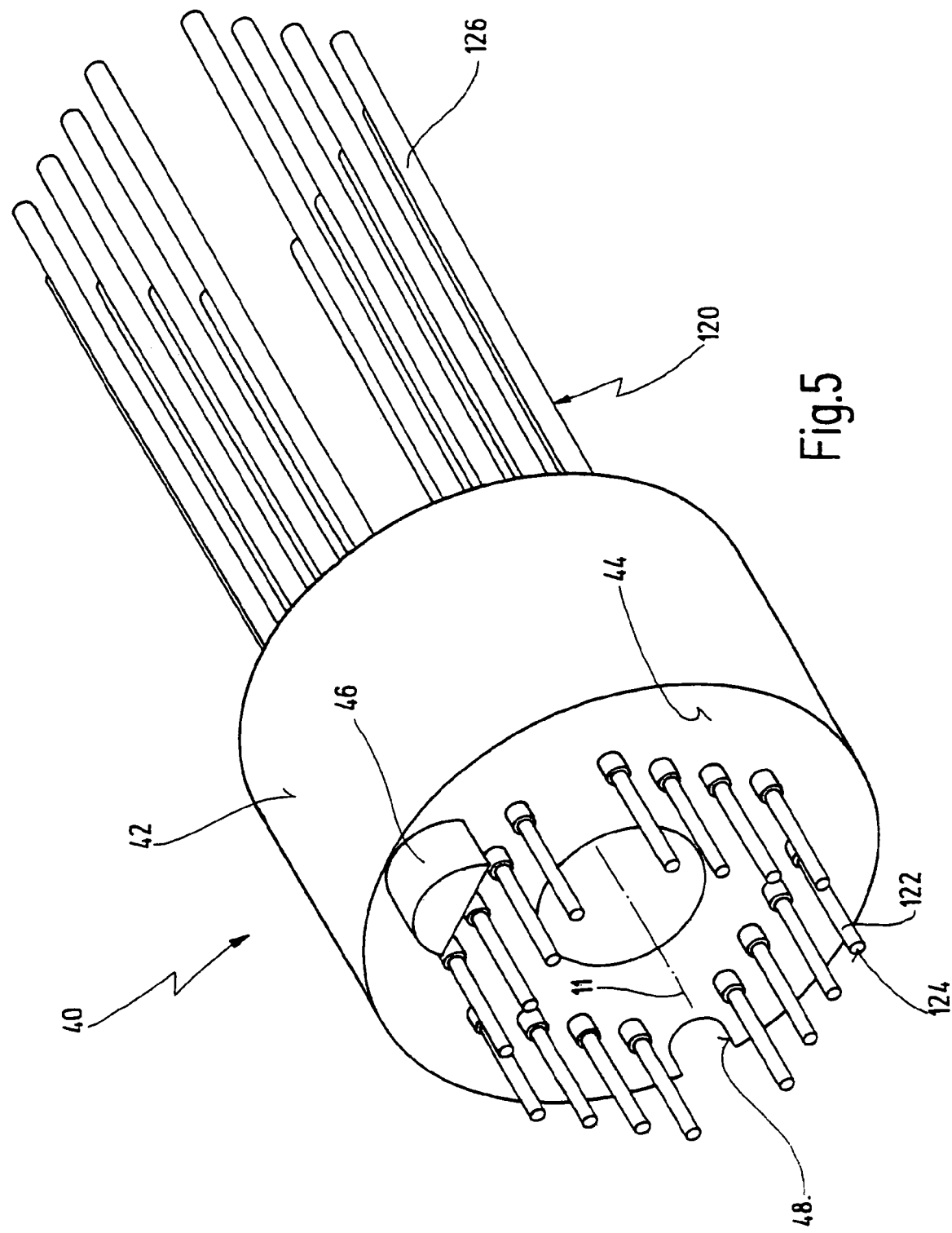
FIG. 5 shows a perspective illustration, on a greatly enlarged scale, of a spring pin holder of the probe head in accordance with FIGS. 1 and 2.

As may now be gathered in further detail from FIG. 2, there is plugged into the through opening 30 a substantially cylindrical spring pin holder 40 whose outer cylindrical surface 42 is adapted to the first inner cylindrical surface 32 such that at the front end, that is to say the right-hand one in FIG. 1, of the probe receptacle 13 the spring pin holder 40 is held radially and, via its front side 44, also axially at the inner annular shoulder 28. A projection 46, which is to be discerned particularly clearly in FIG. 5, engages in a corresponding cutout on the inner annular shoulder 28 such that the spring pin holder 40 is also fixed in its rotary position when seated in its operational position illustrated in FIGS. 1 and 2. Alternatively, it is also possible for this purpose to provide a recess 48 on the periphery of the spring pin holder 40, as is illustrated in FIG. 5.

In order to fix the spring pin holder 40 in the position illustrated in FIGS. 1 and 2, use is made of a hold down sleeve 50 that strikes in FIGS. 1 and 2 in the axial direction against a rear side 51 of the spring pin holder 40. The hold down sleeve 50 is provided for this purpose with a tapered front end 52.

The hold down sleeve 50 runs with its outer cylindrical surface 53 in the second inner cylindrical surface 34 of the through opening 30. A rear end 54 of the hold down sleeve 50 is provided with a peripheral slot 56, which is illustrated in FIG. 1.

The purpose of fixing the hold down sleeve 50 in the position illustrated in FIGS. 1 and 2 is served by a hold down nut 60 that runs with its outer cylindrical surface 61 in the second inner cylindrical surface 34 of the through opening 30. The hold down nut 60 is provided on its front side with an annular projection 62 located on its periphery and which engages in the peripheral slot 56 of the hold down sleeve 50.

The hold down nut 60 is provided at the rearward end with an external thread 64 that runs in the internal thread 36 of the probe receptacle 14. The hold down nut 60 can therefore be screwed into the through opening 30 by means of suitable peripheral grooves and the like (not illustrated) until it presses the hold down sleeve 50 against the spring pin holder 40, and the latter bears permanently with its front side 44 against the inner annular shoulder 28 in an axial fashion.

A replaceable, miniaturized probe or feeler system in the form of a sleeve-shaped probe holder 70 can be pushed onto the front end section 26 of the probe receptacle 14. The probe holder 70 has a rear section, that is to say a left-hand one in FIGS. 1 and 2. This section is provided with a conical inner surface 74 that is constructed to be complementary to the conical outer surface 24 on the conically tapered section 22 of the probe receptacle 14. The probe holder 70 is thereby centered on this section 22 of the probe receptacle 14.

A middle section 76 of the probe holder 70 runs with an inner cylindrical surface 78 on the front end section 26 of the probe receptacle 14.

When the probe holder 70 is pushed onto the front end of the probe receptacle 14 in the way described, it can be fixed in this position by means of a union nut 79 that can be screwed onto the external thread 20 of the probe receptacle 14.

A front section 80 of the probe holder 70 extends downward substantially in the radial direction and exposes the central opening 82 in the region of the axis 11. This and further details are to be discerned particularly well from the perspective illustration in FIG. 3.

At a peripheral position, the middle section 76 of the probe holder 70 is provided with a radial bore 84 into which a ball 86 is inserted and is prestressed radially inward, preferably by means of a spring (not illustrated). The bore 84 merges into an axial slot 88 in the front end section 26 of the probe receptacle 14 that is likewise provided only at a peripheral position of the probe receptacle 14. Consequently, when the probe holder 70 is pushed, in the way described and illustrated in FIGS. 1 and 2, onto the front end of the probe receptacle 14 and then rotated about the axis 11, a defined rotary position is additionally reached when the ball 86 partially enters the axial slot 88 from the bore 84.

Figure 3:
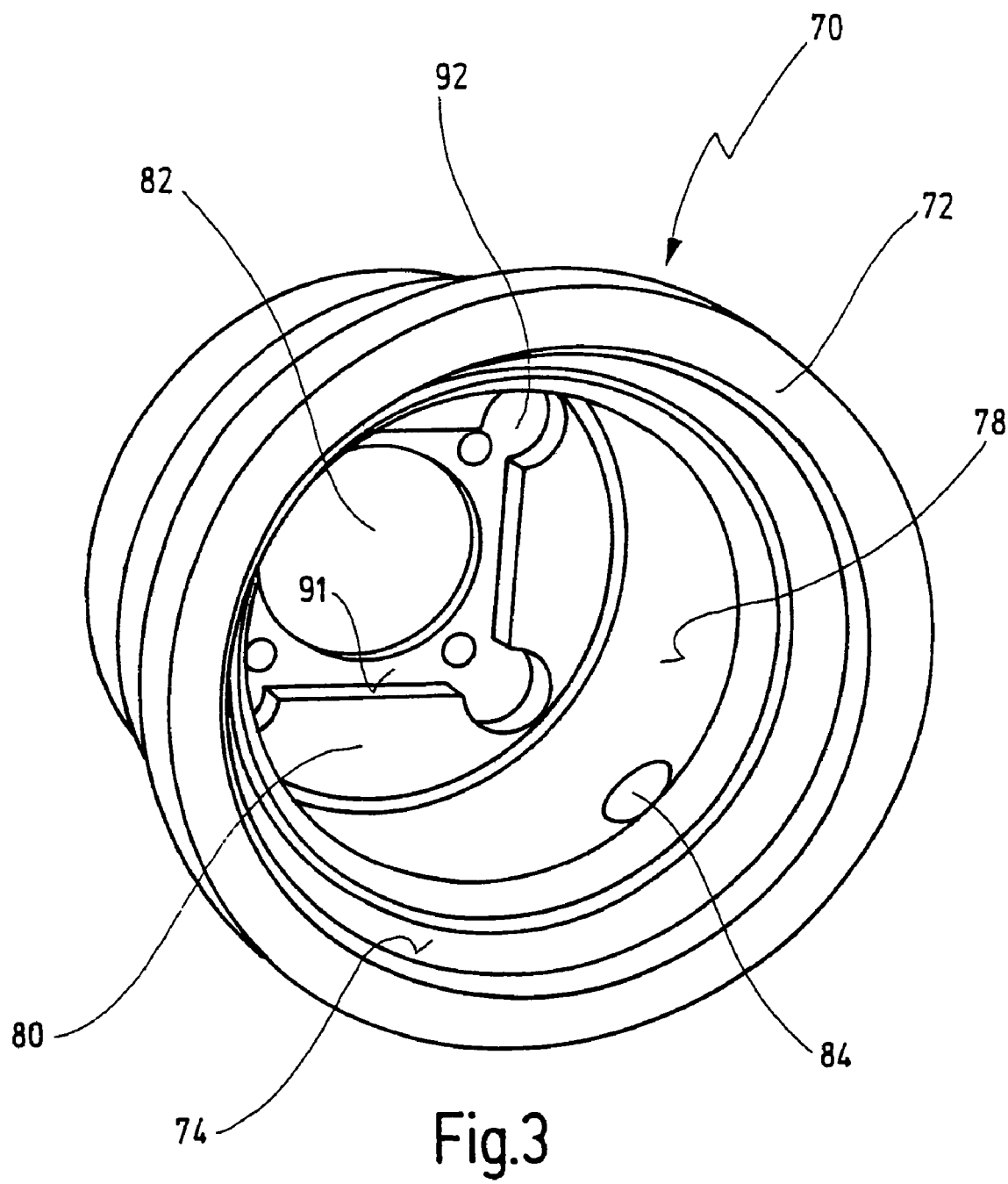
FIG. 3 shows a perspective view of a probe holder from the probe of FIGS. 1 and 2.

As may be discerned particularly well from the perspective illustration in FIG. 3, but also from FIG. 2, the front section 80 of the probe holder 70 has a rear side 90 that extends substantially in a radial plane relative to the axis 11. A cutout 91 of square shape, for example, is located in the rear side 90. Bonding pockets 92 are located at the corners of the cutout 91.

This arrangement serves for mounting a sensor system 100, e.g. for adhering it. When being mounted, the sensor system 100 is inserted into the cutout 91 and then fixed on the rear side 90 by filling adhesive into the bonding pockets 92 and by subsequently hardening the adhesive.

The sensor system 100 fixed in this way is mechanically extremely sensitive, and so a protective cap 101 can be slipped onto the middle section 76 of the probe holder 70 in order to prevent damage to the sensor system 100 when the latter is not being operated.

The sensor system 100 that is known per se from DE 101 08 774 A1 cited at the beginning has either the square shape in plan view that emerges from FIG. 3, or a circular shape.

As may be gathered in further detail from FIGS. 4A and 4B, the sensor system 100 has a thickened edge 102 and a raised middle 104, which is called boss, a membrane area 106 being located between the edge 102 and middle 104. The thickness of the edge 102 is denoted by D in FIG. 4A, and the thickness of the membrane area 106 is denoted by d. The sensor system 100 is preferably of silicon based construction and can, for example, have an edge length of approximately 6 mm. In this exemplary embodiment, the thickness D is, for example, 0.5 mm, and the thickness d is approximately 30 μm.

Extending from the middle 104 in the direction of the axis 11 there is a stylus 108 at whose free end a ball 110 is located. In this exemplary embodiment, the stylus 108 can have a length of 8 mm and a diameter of 0.2 mm, while the stylus ball 110 can have a diameter of 0.3 mm.

Sensor elements 114 are provided on the rear side 112 of the sensor system 100. The sensor elements 114 operate electrically. They can, for example, be constructed as strain gauges or as piezoelectric elements. The sensor system 100 with the stylus 108 and the sensor elements 114 forms an overall structural unit 116 that is adhered, that is to say premounted, in the way described above on the rear side 90 of the front section 80 of the probe holder 70.

FIG. 4C shows a first embodiment of a sensor system 100 according to the invention. In this sensor system, the membrane area 106 is constructed—in plan view—in the form of a rectangular, preferably square frame, and the raised middle 104 is constructed as a four-sided pyramidal frustum in the center of the membrane area 106 with a basic surface that is likewise square, as is known per se from DE 101 08 774 A1. The membrane area 106 has, for example, an outer edge length of 3 mm, and the pyramidal frustum a lower edge length of 1.6 mm.

In a second embodiment in accordance with FIG. 4D, the membrane area 106 of a sensor system 100' is likewise of square construction, whereas the raised middle 104' is constructed in the form of a conical frustum. The lower diameter of the conical frustum is 1.6 mm, for example.

In a third embodiment, the membrane area 106' of a sensor system 100" is of circular construction in plan view and the raised middle 104' is constructed, in turn, in the form of a conical frustum. The annular ring has, for example, an outside diameter of 3 mm.

In the case of the second and third embodiments, the site of maximum deformation at the inner edge is located inside the membrane area 106 or 106'. In these cases, it is therefore preferred to fit the sensor elements 114 there.

The second and third embodiments can also be used independently of the other features of the invention presently being described.

The electric contact with the sensor elements 114 is achieved with the aid of a plurality of spring pins 120. The exemplary embodiment illustrated in FIG. 5 provides four groups of in each case four spring pins offset in each case by 90° to one another and distributed around the axis 11. The spring pins 120 each have a front section 122 that can be applied with the aid of a front tip 124 to an associated contact platelet (not illustrated) of a sensor element 114. The front sections 122 of the spring pins 120 are mounted in an axially resilient fashion in rear sections 126 of the spring pins 120.

In the case of the probe head 10 described above, the procedure for switching the stylus 108 between two measurement operations is as follows:

Firstly, the union nut 79 is screwed off from the external thread 20. Next, the probe holder 70 is removed, with or without the protective cap 101 slipped on, from the front end of the probe receptacle 14 in the direction of the axis 11. In this process, the sensor system 100 is automatically detached from the spring pins 120, which are lifted from the respectively associated contact platelets of the sensor elements 114 during this withdrawal.

The next step now requires a new probe holder 70 with the desired other stylus 108 to be pushed in the axial direction onto the front end of the probe receptacle 14, it being ensured by the rotation in the peripheral direction that the ball 86 passes into the position illustrated in FIG. 2 in which the predetermined rotary position is reached. The probe holder 70 need now only be fixed in the axial direction by screwing the union nut 79 onto the external thread 20. The conical fit 24/74 in this case automatically centers the probe holder 70 relative to the axis 11.

The above mentioned mounting operations can easily be automated, in particular with the aid of an NC-controlled robot, in particular of the coordinate measuring machine itself.

What is claimed is:

1. A probe head for a coordinate measuring machine, comprising:
   a probe system having a membrane-type sensor system with sensor elements and a stylus that is fixed to the sensor system,
   a probe holder, and
   a probe receptacle,
   wherein the membrane-type sensor system is of silicon-based construction and is deformed in a predetermined way when a force acts on the stylus,
   wherein the sensor elements are configured for detecting a deformation of the sensor system,
   wherein the stylus and the membrane-type sensor system form a structural unit which is permanently connected to the probe holder, and
   wherein the probe holder is configured to be replaceably connected to the probe receptacle in order to replaceably mount the structural unit on the coordinate measuring machine.

2. The probe head of claim 1, wherein the probe holder is constructed like a sleeve.

3. The probe head of claim 1, wherein the probe holder provides for a mechanical fastening of the structural unit in the probe receptacle, the probe head further comprising a connector for electrically contacting the sensor elements, with the connector being structurally separate from the mechanical fastening of the structural unit in the probe receptacle.

4. The probe head of claim 3, wherein the connector comprises spring pins for making contact with the sensor elements.

5. The probe head of claim 4, wherein the sensor system comprises a rear side facing away from the stylus, the sensor elements being configured to be contacted from the rear side.

6. The probe head of claim 1, wherein the probe holder has a rear section that is configured to be connected to the probe receptacle via a conical fit.

7. The probe head of claim 1, wherein the probe holder comprises a front section, the sensor system being mounted in the vicinity of said front section.

8. The probe head of claim 1, wherein the probe holder comprises a rear side having a radial rear portion, the sensor system being mounted on the radial rear portion.

9. The probe head of claim 8, wherein the sensor system is adhered to the radial rear portion.

10. The probe head of claim 1, wherein the probe holder has a central opening, the stylus projecting through the central opening.

11. The probe head of claim 1, wherein the sensor system has a thickened edge, the stylus being arranged in the middle of the sensor system, and a membrane area being located between the thickened edge and the middle.

12. A probe head for a coordinate measuring machine, comprising:
   a miniaturized probe system comprising a membrane-type sensor system and a stylus, the stylus being rigid and forming a structural unit together with the membrane-type sensor system, and
   a replaceable probe holder,
   wherein the membrane-type sensor system deforms in a pre-determined way when a force acts on the stylus, and
   wherein the probe system is permanently connected to the probe holder such that the structural unit can be handled together with the probe holder when the stylus is being replaced.

13. The probe head of claim 12, wherein the probe holder is constructed like a sleeve.

14. The probe head of claim 12, further comprising a probe receptacle, wherein the probe holder has a rear section configured to be connected to the probe receptacle.

15. The probe head of claim 14, wherein the probe receptacle extends along an axis, and wherein the probe holder is configured to be connected to the probe receptacle in a predetermined rotary position relative to the axis.

16. The probe head of claim 14, wherein the probe receptacle extends along an axis and comprises a front end section, and wherein the probe holder is configured to be connected to the front end section.

17. The probe head of claim 12, wherein the sensor system comprises a rear side facing away from the stylus and comprises electric sensor elements arranged on the rear side, the electric sensor elements being configured for detecting any deformation of the sensor system.

18. The probe head of claim 17, further comprising spring pins for making contact with the sensor elements.

19. The probe head of claim 18, further comprising a spring pin holder for holding a plurality of spring pins.

20. The probe head of claim 12, wherein the sensor system has a thickened edge, wherein the stylus is arranged in the middle of the sensor system, and wherein a membrane area is located between the thickened edge and the middle.

21. The probe head of claim 12, wherein the sensor system is of silicon-based construction.

* * * * *